United States Patent
Nakamura et al.

(10) Patent No.: US 10,833,498 B2
(45) Date of Patent: Nov. 10, 2020

(54) ASSEMBLY COMPONENT OF COMPRESSION TYPE ANCHOR CLAMP, ANCHOR STRUCTURE OF POWER-TRANSMISSION LINE AND METHOD OF CONSTRUCTING COMPRESSION TYPE ANCHOR CLAMP

(71) Applicants: SUMIDEN TRANSMISSION AND DISTRIBUTION SYSTEM PRODUCTS, LTD., Hyogo (JP); TOKYO ROPE MFG. CO., LTD., Tokyo (JP)

(72) Inventors: Mitsuhide Nakamura, Hyogo (JP); Masashi Domoto, Hyogo (JP); Takashi Hiramatsu, Tokyo (JP)

(73) Assignees: SUMIDEN TRANSMISSION AND DISTRIBUTION SYSTEM PRODUCTS, LTD., Hyogo (JP); TOKYO ROPE MFG. CO., LTD., Tokyo (JP)

( * ) Notice: Subject to any disclaimer, the term of this patent is extended or adjusted under 35 U.S.C. 154(b) by 0 days.

(21) Appl. No.: 16/071,265

(22) PCT Filed: Jan. 24, 2017

(86) PCT No.: PCT/JP2017/002234
§ 371 (c)(1),
(2) Date: Jul. 19, 2018

(87) PCT Pub. No.: WO2017/130928
PCT Pub. Date: Aug. 3, 2017

(65) Prior Publication Data
US 2019/0288497 A1 Sep. 19, 2019

(30) Foreign Application Priority Data
Jan. 25, 2016 (JP) ................. 2016-011955

(51) Int. Cl.
*H02G 7/05* (2006.01)
*F16G 11/02* (2006.01)
(Continued)

(52) U.S. Cl.
CPC ............. *H02G 7/056* (2013.01); *F16G 11/02* (2013.01); *H01R 4/20* (2013.01); *H02G 1/02* (2013.01); *H02G 7/04* (2013.01)

(58) Field of Classification Search
CPC .. H02G 7/02; H02G 7/04; H02G 7/05; H02G 7/056; H02G 7/20; H01R 4/20; H01R 4/5025; F16G 11/02
See application file for complete search history.

(56) References Cited

U.S. PATENT DOCUMENTS 6,015,953 A * 1/2000 Tosaka ................ H01R 4/20
174/79
6,805,596 B2 * 10/2004 Quesnel .............. H01R 11/09
174/840
(Continued)

FOREIGN PATENT DOCUMENTS

JP H5-084135 U 11/1993
JP H7-250418 9/1995
(Continued)

OTHER PUBLICATIONS

Fumiya Sato, Hirotoshi Ebiko, "Development of Aluminum Conductor Carbon Fiber Reinforced", SWCC Showa Group technical review, vol. 52, No. 1 (2002), p. 54-58.

Primary Examiner — Paresh H Paghadal
(74) Attorney, Agent, or Firm — IPUSA, PLLC

(57) ABSTRACT

An assembly component of a compression type anchor clamp includes: a housing tube that houses an end portion of a core portion of a power-transmission line; a core portion compression member, made of steel, that includes a housing hole to house the end portion of the core portion and the (Continued)

housing tube and is to be compressed with the core portion and the housing tube; and a conductive portion compression member, made of pure aluminum or an aluminum alloy, that houses an end portion of a conductive portion of the power-transmission line and the core portion compression member and is to be compressed with the conductive portion and the core portion compression member, wherein the housing tube is constituted by pure aluminum or an aluminum alloy whose Vickers hardness "Hv" is less than or equal to 30, and continuously provided in its cylindrical direction without a gap.

10 Claims, 9 Drawing Sheets

(51) Int. Cl.
*H01R 4/20* (2006.01)
*H02G 1/02* (2006.01)
*H02G 7/04* (2006.01)

(56) References Cited

U.S. PATENT DOCUMENTS

| | | | |
|---|---|---|---|
| 9,257,760 B2 * | 2/2016 | Crutcher | H01R 4/5025 |
| 2003/0194916 A1 * | 10/2003 | Quesnel | H01R 11/09 439/784 |
| 2012/0305312 A1 * | 12/2012 | McCullough | F16G 11/02 174/75 R |
| 2015/0075837 A1 * | 3/2015 | Welborn | H01R 43/20 174/90 |

FOREIGN PATENT DOCUMENTS

| | | | | |
|---|---|---|---|---|
| JP | H8-237840 | | 9/1996 | |
| JP | H09322367 A | * | 12/1997 | H02G 1/02 |
| JP | 2013-520769 | | 6/2013 | |
| WO | 2011/103036 | | 8/2011 | |

* cited by examiner 234   230   220
221

235  235  235  235  235  235
230

ASSEMBLY COMPONENT OF COMPRESSION TYPE ANCHOR CLAMP, ANCHOR STRUCTURE OF POWER-TRANSMISSION LINE AND METHOD OF CONSTRUCTING COMPRESSION TYPE ANCHOR CLAMP

CROSS-REFERENCE TO RELATED APPLICATION

The present application is based on and claims the benefit of priority of Japanese Priority Application No. 2016-011955 filed on Jan. 25, 2016, the entire contents of which are hereby incorporated by reference.

BACKGROUND OF THE INVENTION

1. Field of the Invention

The present invention relates to an assembly component of a compression type anchor clamp, an anchor structure of a power-transmission line and a method of constructing a compression type anchor clamp.

2. Description of the Related Art

Patent Documents 1 and 2 each discloses a technique for anchoring a stranded electronic wire including a tension member (TM: core portion) in which a plurality of carbon fiber reinforced plastics (resin) are stranded and a stranded layer (conductive portion) of aluminum (Al) or Al alloy wires provided at its outer periphery. Non Patent Document 1 discloses a technique for anchoring an electronic wire including a composite cable (core portion) in which a plurality of element wires each constituted by carbon fiber and thermosetting resin, and an Al wire portion (conductive portion) in which a plurality of Al wires are stranded around its outer periphery.

PATENT DOCUMENTS

[Patent Document 1] Japanese Laid-open Patent Publication No. H07-250418
[Patent Document 2] Japanese Laid-open Patent Publication No. H08-237840

Non Patent Document

[Non Patent Document 1] Fumiya Sato, Hirotoshi Ebiko, "Development of Aluminum Conductor Carbon Fiber Reinforced", SWCC Showa Group technical review, Vol. 52, No. 1 (2002), p. 54-58

SUMMARY OF THE INVENTION

According to the disclosure, an assembly component of a compression type anchor clamp for anchoring a power-transmission line to an anchoring target, the power-transmission line including a core portion in which a plurality of element wires are stranded, the element wires each having carbon fiber as the main constituent, and a conductive portion in which a plurality of aluminum element wires are stranded at an outer periphery of the core portion is provided. The assembly component of the compression type anchor clamp includes a housing tube, a core portion compression member made of steel and a conductive portion compression member made of pure aluminum or an aluminum alloy. The housing tube houses an end portion of the core portion. The core portion compression member includes a housing hole to house the end portion of the core portion and the housing tube and is to be compressed with the core portion and the housing tube. The conductive portion compression member houses an end portion of the conductive portion and the core portion compression member and is to be compressed with the conductive portion and the core portion compression member. The housing tube is constituted by pure aluminum or an aluminum alloy whose Vickers hardness "Hv" is less than or equal to 30, and continuously provided in its cylindrical direction without a gap.

According to the disclosure, an anchor structure of a power-transmission line that includes a power-transmission line and a compression type anchor clamp that is anchored to an anchoring target by being compressed with an end portion of the power-transmission line is provided. The power-transmission line includes a core portion in which a plurality of element wires, each of whose main constituent is carbon fiber, are stranded, and a conductive portion in which a plurality of aluminum element wires are stranded over an outer periphery of the core portion. The compression type anchor clamp includes a housing tube, a core portion compression member made of steel and a conductive portion compression member made of pure aluminum or an aluminum alloy. The housing tube includes an inner peripheral surface that is formed to fill strand grooves of the core portion and that adheres to the core portion along an outer peripheral outline of the core portion. The core portion compression member includes an inner peripheral surface that adheres to the housing tube along an outer peripheral outline of the housing tube. The conductive portion compression member includes an inner peripheral surface that adheres to the core portion compression member along an outer peripheral outline of the core portion compression member. The housing tube is constituted by pure aluminum or an aluminum alloy, and continuously provided in its cylindrical direction without a gap.

According to the disclosure, a method of constructing a compression type anchor clamp for anchoring a power-transmission line to an anchoring target by using an assembly component of the compression type anchor clamp is provided. The power-transmission line includes a core portion in which a plurality of element wires each of whose main constituent is carbon fiber are stranded, and a conductive portion in which a plurality of aluminum element wires are stranded at an outer periphery of the core portion. The method of constructing the compression type anchor clamp includes a preparation step, a housing tube housing step, a core portion connecting step and a conductive portion connecting step.

In the preparation step, the assembly component of the compression type anchor clamp of the embodiment of the invention is prepared.

In the housing tube housing step, the housing tube, in which an end portion of the core portion exposed by stepwisely peeling an end portion of the power-transmission line is housed, is housed in the housing hole of the core portion compression member.

In the core portion connecting step, the core portion and the core portion compression member are connected by compressing the core portion compression member to deform the housing tube via the core portion compression member to be fitted into a strand groove of the core portion so that spaces between the core portion and the housing tube are filled.

In the conductive portion connecting step, an end portion of the conductive portion and the core portion compression member are connected with the conductive portion compression member by housing the end portion of the conductive portion and the core portion compression member in the conductive portion compression member, and compressing the conductive portion compression member.

DETAILED DESCRIPTION OF THE PREFERRED EMBODIMENTS

Figure 1:
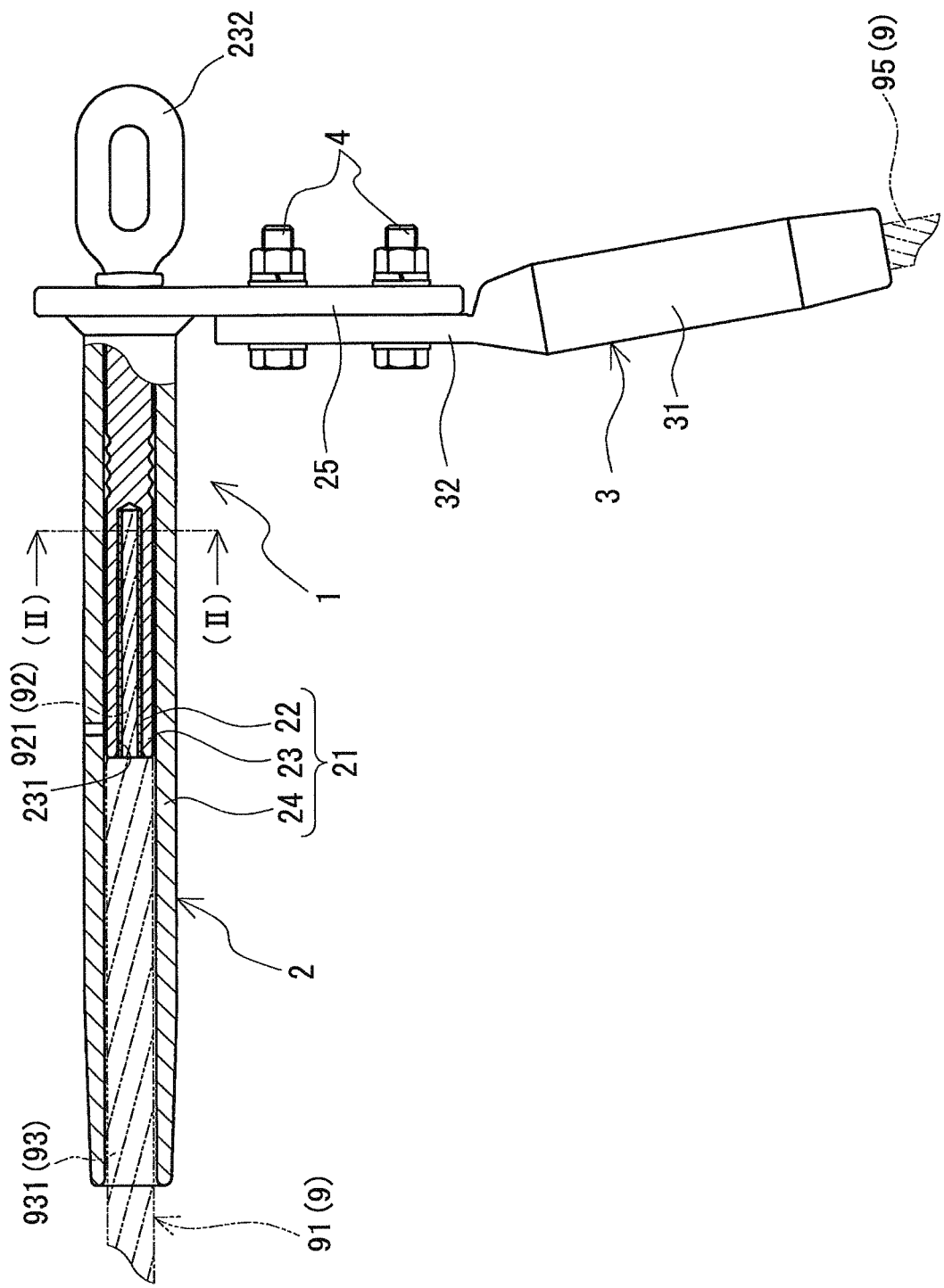
FIG. 1 is a partial cross-sectional view of an assembly component of a compression type anchor clamp of an embodiment.

As an aerial power-transmission line, a steel-cored aluminum cable (ACSR: Aluminum Conductor Steel Reinforced) is used in which a plurality of aluminum (Al) lines are stranded around an outer periphery of a steel-core in which steel wires are stranded. The ACSR is anchored to an insulator of a steel tower by a two-piece compression type anchor clamp including a steel sleeve (core portion compression member) that houses, compresses and connects a steel-core, whose end portion is exposed by stepwisely peeling, and an Al sleeve (conductive portion compression member) that houses, compresses and connects the steel sleeve and an Al wire.

The ACSR may become slack when the temperature of the steel wire increase and the steel wire thermally expands in accordance with increasing of temperature of the Al wire when a current is flowing through the ACSR. As a power-transmission line that does not easily thermally expand and is not easily loosened, compared with the ACSR, a carbon fiber-cored aluminum cable is known that uses a CFRP (Carbon Fiber Reinforced Plastic) strand instead of the steel-core. In other words, the carbon fiber-cored aluminum cable is constituted by stranding a plurality of Al wires at an outer periphery of the CFRP strand. The CFRP strand is configured by stranding a plurality of element wires made of Carbon Fiber Reinforced Plastic (CFRP) constituted by carbon fiber and resin. As a technique similar to the carbon fiber-cored aluminum cable, for example, techniques disclosed in the above described Patent Documents 1 and 2 and Non Patent Document 1 are known.

The development of an assembly component of a compression type anchor clamp is required in which a core portion does not collapse even when a core portion compression member that houses the core portion is directly compressed and high tensile strength is obtained with a small size. According to Patent Documents 1 and 2, although collapse of the core portion may be suppressed because the steel clamp is not directly compressed, it is difficult to increase tensile strength. According to Non Patent Document 1, as a length of the aluminum sleeve is made longer than an aluminum sleeve of an anchor clamp for the ACSR in order to increase holding force, the size of the compression type anchor clamp also increases.

Description of Embodiment of Invention

First, embodiments of the invention are described in order.

(1) An assembly component of a compression type anchor clamp of the embodiment anchors a power-transmission line, including a core portion in which a plurality of element wires each of whose main constituent is carbon fiber are stranded, and a conductive portion in which a plurality of aluminum element wires are stranded at an outer periphery of the core portion, to an anchoring target. The assembly component of the compression type anchor clamp includes a housing tube, a core portion compression member made of steel, and a conductive portion compression member made of pure aluminum or an aluminum alloy. The housing tube houses an end portion of the core portion. The core portion compression member includes a housing hole to house the end portion of the core portion and the housing tube and is to be compressed with the core portion and the housing tube. The conductive portion compression member houses an end portion of the conductive portion and the core portion compression member and is to be compressed with the conductive portion and the core portion compression member. Then, the housing tube is constituted by pure aluminum or an aluminum alloy whose Vickers hardness "Hv" is less than or equal to 30, and continuously provided in its cylindrical direction without a gap.

With the above structure, with a small size, high tensile strength can be obtained even when the core portion compression member, in which the core portion is housed, is directly compressed, without collapsing the core portion.

By including the housing tube, as will be described later in detail, even when the core portion compression member is directly compressed, collapse of the core portion can be suppressed. In other words, by using the assembly component of the compression type anchor clamp, the core portion and the conductive portion can be separately compressed and held. Thus, different from the conventional technique, it is unnecessary to form the conductive portion compression member to be longer to ensure holding forces for the core portion and the conductive portion only by the conductive portion compression member. Thus, the assembly component of the compression type anchor clamp is small.

When the core portion compression member is compressed, the housing tube can moderate an action of compressive force to the core portion, and suppress collapse of the core portion by being deformed by the compressive force via the core portion compression member. In addition, the housing tube can fill spaces between the core portion and the housing tube and can adhere to the core portion by entering into a strand groove of the core portion by the deformation without collapsing the core portion. Thus, the housing tube that enters the strand groove can form a mechanically stronger bonding state with the core portion. Thereby resulting in higher tensile strength.

Provided that the Vickers hardness "Hv" of the housing tube is less than or equal to 30, when the core portion compression member is compressed, the housing tube is easily deformed via the core portion compression member. Thus, the housing tube easily moderates an action of the compressive force to the core portion, and also easily adheres to the core portion.

As the housing tube is constituted by pure aluminum or an aluminum alloy, by the action of the compressive force to the housing tube, work hardening sufficiently enough to strongly hold the core portion is easily obtained.

By continuously providing the housing tube in its cylindrical direction without a gap, the housing tube becomes a single member with a simple shape, and different from a conventional die-cast product, it is unnecessary to be formed into a complicated shape, and handling of the member and attachment to the power-transmission line are easy. In addition, when the compressive force to the core portion compression member acts on the housing tube via the core portion compression member, the housing tube can deform while moderating the compressive force without collapsing the core portion and can enter the strand groove of the core portion.

(2) As an embodiment of the assembly component of the compression type anchor clamp, the thickness of the housing tube may be greater than or equal to 1.0 mm and less than or equal to 5.0 mm.

Provided that the thickness of the housing tube is greater than or equal to 1.0 mm, when the housing tube is deformed by compressing the core portion compression member, it is easy for the deformed housing tube to fill the strand groove of the core portion and spaces between the core portion and the housing tube is easily filled. Provided that the thickness of the housing tube is less than or equal to 5.0 mm, when the core portion compression member is compressed, the housing tube is easily deformed. In addition, the housing tube is not too thick and increases in the size of the assembly component of the compression type anchor clamp may be suppressed.

(3) As an embodiment of the assembly component of the compression type anchor clamp, the core portion compression member may include an inclined portion, provided at an open side of the housing hole, whose outer diameter decreases toward an open end of the housing hole.

According to the above described structure, when compressing the core portion compression member, due to the inclined portion, inordinate compressive force can be suppressed from acting on the core portion at the open end of the core portion compression member, and collapse of the core portion at the open end of the core portion compression member can be suppressed.

(4) As an embodiment of the assembly component of the compression type anchor clamp in which the core portion compression member includes the inclined portion, the length of the inclined portion may be greater than or equal to ½ times and less than or equal to twice of the outer diameter of the core portion compression member.

If the length of the inclined portion is greater than or equal to ½ times of the outer diameter of the core portion compression member, inordinate compressive force is easily suppressed from acting on the core portion at the front end of the core portion compression member. If the length of the inclined portion is less than or equal to twice of the outer diameter of the core portion compression member, the length of the inclined portion does not become too long, and the core portion compression member can be sufficiently compressed along its axial direction to easily increase holding force, and high tensile strength is easily obtained.

(5) An anchor structure of a power-transmission line of the embodiment includes a power-transmission line and a compression type anchor clamp that is anchored to an anchoring target by being compressed with an end portion of the power-transmission line. The power-transmission line includes a core portion in which a plurality of element wires each of whose main constituent is carbon fiber are stranded, and a conductive portion in which a plurality of aluminum element wires are stranded at an outer periphery of the core portion. The compression type anchor clamp includes a housing tube, a core portion compression member made of steel, and a conductive portion compression member made of pure aluminum or an aluminum alloy. The housing tube includes an inner peripheral surface that is formed to fill a strand groove of the core portion and that adheres to the core portion along an outer peripheral outline of the core portion. The core portion compression member includes an inner peripheral surface that adheres to the housing tube along an outer peripheral outline of the housing tube. The conductive portion compression member includes an inner peripheral surface that adheres to the core portion compression member along an outer peripheral outline of the core portion compression member. The housing tube is constituted by pure aluminum or an aluminum alloy, and continuously provided in its cylindrical direction without a gap.

According to the above described structure, bonding strength between the power-transmission line and the compression type anchor clamp is high. This is because a strand groove of the core portion and the housing tube, the housing tube and the core portion compression member, and the core portion compression member and the conductive portion compression member are respectively adhered with each other without collapsing the core portion. In particular, as the housing tube is formed to fill the strand groove of the core portion, mechanical bonding between the core portion and the housing tube becomes stronger.

(6) As an embodiment of the anchor structure of the power-transmission line, the core portion compression member may include an inclined portion, provided at an open side of a housing hole, whose outer diameter decreases toward an open end of the housing hole.

According to the above described structure, bonding strength between the power-transmission line and the compression type anchor clamp is high. This is because the power-transmission line can be compressed by the compression type anchor clamp without collapsing the core portion. By including the inclined portion, when compressing the core portion compression member in a construction process, compressive force moderately acts on the inclined portion when the inclined portion is compressed. Thus, inordinate compressive force is suppressed from acting on the core portion at the open end of the core portion compression member.

(7) As an embodiment of the anchor structure of the power-transmission line, the core portion compression member may include three or more compression traces (compression marks) formed to align in an axial direction of the core portion compression member, and an interval between adjacent compression traces of the core portion compression member may be the longest at an open side of the core portion compression member.

According to the above described structure, bonding strength between the power-transmission line and the compression type anchor clamp is high. This is because the power-transmission line can be compressed by the compression type anchor clamp without collapsing the core portion. As the interval between the compression traces of the core portion compression member is the longest at the open side of the core portion compression member, this means that compression of the core portion compression member is performed from the open side in the construction process. Thus, in the construction process, inordinate compressive force is suppressed from acting on the core portion at the open end of the core portion compression member, and collapse of the core portion at the open end of the core portion compression member is suppressed.

(8) In a method of constructing a compression type anchor clamp of the embodiment, a power-transmission line is anchored to an anchoring target by using an assembly component of a compression type anchor clamp. The power-transmission line includes a core portion in which a plurality of element wires each of whose main constituent is carbon fiber are stranded, and a conductive portion in which a plurality of aluminum element wires are stranded at an outer periphery of the core portion. The method of constructing the compression type anchor clamp includes a preparation step, a housing tube housing step, a core portion connecting step, and a conductive portion connecting step.

In the preparation step, the assembly component of the compression type anchor clamp according to the above any one of (1) to (4) is prepared.

In the housing tube housing step, the housing tube, in which an end portion of the core portion exposed by stepwisely peeling an end portion of the power-transmission line is housed, is housed in the housing hole of the core portion compression member.

In the core portion connecting step, the core portion and the core portion compression member are connected by compressing the core portion compression member to deform the housing tube via the core portion compression member to be fitted into a strand groove of the core portion so that spaces between the core portion and the housing tube are filled.

In the conductive portion connecting step, an end portion of the conductive portion and the core portion compression member are connected with the conductive portion compression member by housing the end portion of the conductive portion and the core portion compression member in the conductive portion compression member, and compressing the conductive portion compression member.

According to the above described structure, by using the above described assembly component of the compression type anchor clamp, the anchor structure of the power-transmission line of a small size can be constructed, and in addition, high tensile strength is obtained. Thus, the anchor structure of the power-transmission line having good bonding strength between the power-transmission line and the compression type anchor clamp can be constructed.

(9) As one embodiment of the method of constructing the compression type anchor clamp, the thickness of the housing tube may be greater than or equal to ½ times and less than or equal to 3/2 times of a diameter of the element wire of the core portion.

Provided that the thickness of the housing tube is greater than or equal to ½ times of the diameter of the element wire of the core portion, when the housing tube is deformed by compressing the core portion compression member, the deformed housing tube is easily filled in the strand groove of the core portion and spaces between the core portion and the housing tube are easily filled, without collapsing the core portion. Provided that the thickness of the housing tube is less than or equal to 3/2 times of a diameter of the element wire of the core portion, when the core portion compression member is compressed, the housing tube is easily deformed. In addition, the housing tube does not become too thick, and the assembly component of the compression type anchor clamp is suppressed from becoming a large size. Thus, construction using the assembly component becomes easy.

(10) As one embodiment of the method of constructing the compression type anchor clamp, a difference between an inner diameter of the housing tube and a diameter of a circumcircle of the core portion may be less than or equal to ⅕ times of the diameter of the circumcircle of the core portion, before compression.

According to the above described structure, when the housing tube is deformed by compressing the core portion compression member, the deformed housing tube is easily filled in the strand groove of the core portion, and spaces between the core portion and the housing tube are easily filled.

(11) As one embodiment of the method of constructing the compression type anchor clamp, a compressibility ratio in the core portion connecting step may be greater than or equal to 5% and less than or equal to 15%.

When the compressibility ratio is greater than or equal to 5%, by including the above described housing tube, the core portion and the core portion compression member can be sufficiently connected. When the compressibility ratio is less than or equal to 15%, by including the above described housing tube, compressive force that acts on the core portion does not become too large, and collapse of the core portion is easily suppressed.

(12) As one embodiment of the method of constructing the compression type anchor clamp, the core portion compression member may include an inclined portion, provided at an open side of the housing hole, whose outer diameter decreases toward an open end of the housing hole.

According to the above described structure, when compressing the core portion compression member, due to the inclined portion, inordinate compressive force can be suppressed from acting on the core portion at the open end of the core portion compression member, and collapse of the core portion at the open end of the core portion compression member can be suppressed.

(13) As one embodiment of the method of constructing the compression type anchor clamp in which the core portion compression member includes the inclined portion, in the core portion connecting step, compression of the core portion compression member may be separately performed for a plurality of times from an inclined portion side in an axial direction of the core portion compression member.

According to the above described structure, by providing the inclined portion at the open side of the core portion compression member, inordinate compressive force can be suppressed from acting on the core portion at the open end of the core portion compression member, and collapse of the core portion at the open end of the core portion compression member is easily suppressed.

According to the above described structure, by separately compressing by a plurality of times in the axial direction, damage to the core portion is easily suppressed. By increasing the dividing number in the axial direction, each compression width can be made smaller, and damage to the core portion is easily suppressed. Smaller the each compression width is, smaller a degree of deformation of the housing tube in each compression becomes and smaller a spread of the housing tube in the axial direction becomes. Thus, force of an action in the axial direction of the core portion by the deformation of the housing tube can be made small.

Further, by compressing the core portion compression member from the inclined portion side, even when the length of the housing hole of the core portion compression member is different, it is easy to keep a compression state of the core portion at the inclined portion always constant. Thus, compared with a case when the core portion compression member from an opposite side of the inclined portion, a step of adjusting a compression width in order to suppress damage to the core portion at the inclined portion can be omitted.

Detail of Embodiment

The embodiment of the invention is described in detail. First, an assembly component of a compression type anchor clamp of the embodiment is described, and thereafter, a connection structure of a power-transmission line and a method of constructing the compression type anchor clamp are described in order. The present invention is not limited to the specifically disclosed embodiments, and numerous variations and modifications may be made without departing from the spirit and scope of the present invention.
(Assembly Component of Compression Type Anchor Clamp)

Figure 2:
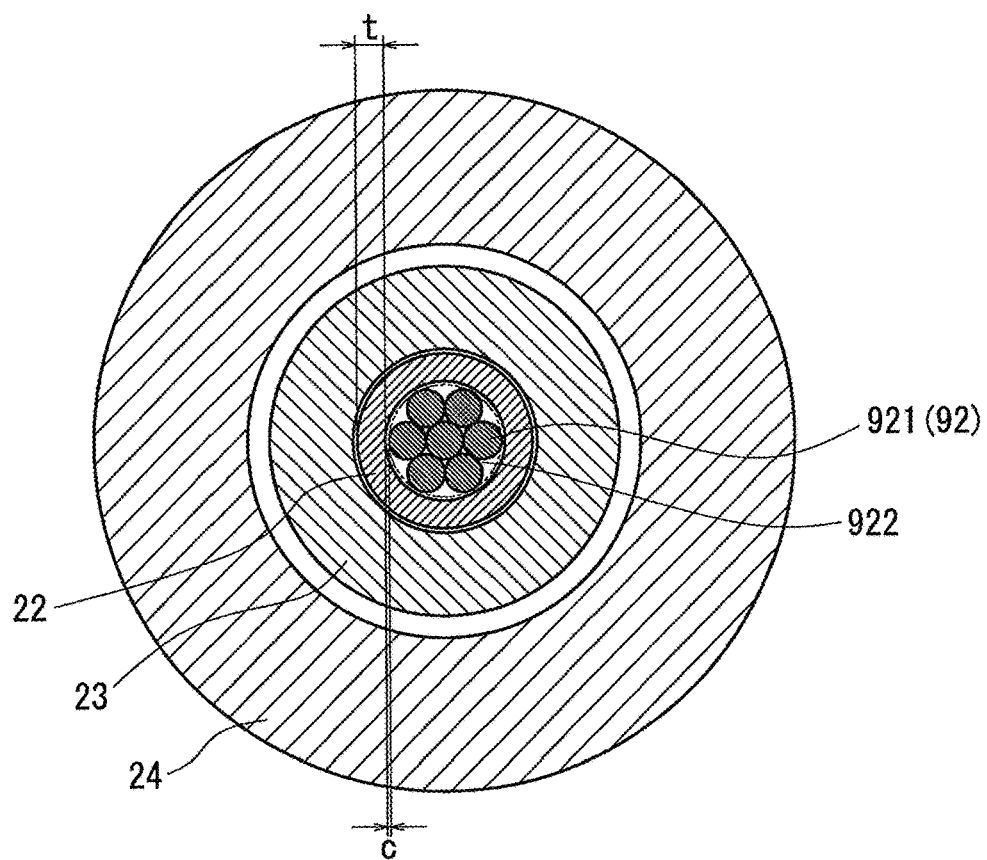
FIG. 2 is a cross-sectional view illustrating the assembly component of the compression type anchor clamp of FIG. 1 taken along a (II)-(II) cutting-plane line.
Figure 3:
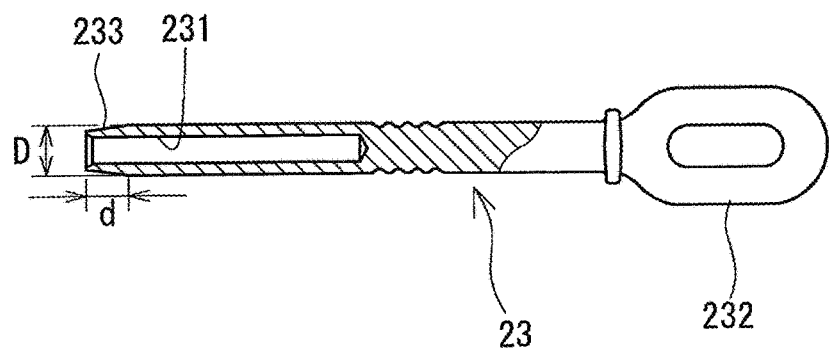
FIG. 3 is a partial cross-sectional view illustrating another example of a core portion compression member included in the assembly component of the compression type anchor clamp of the embodiment.
Figure 4:
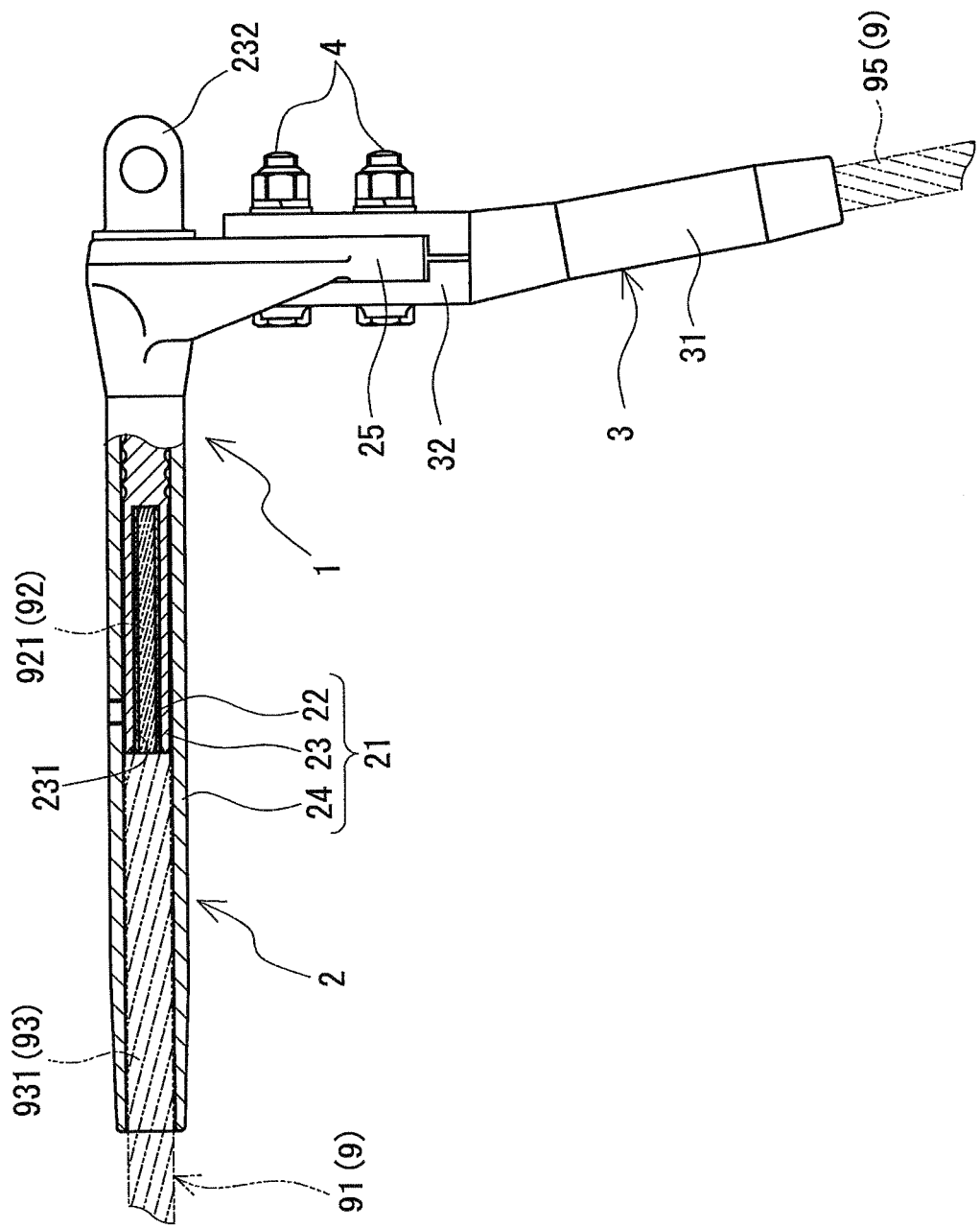
FIG. 4 is a partial cross-sectional view illustrating another example of the assembly component of the compression type anchor clamp of the embodiment.
Figure 5:
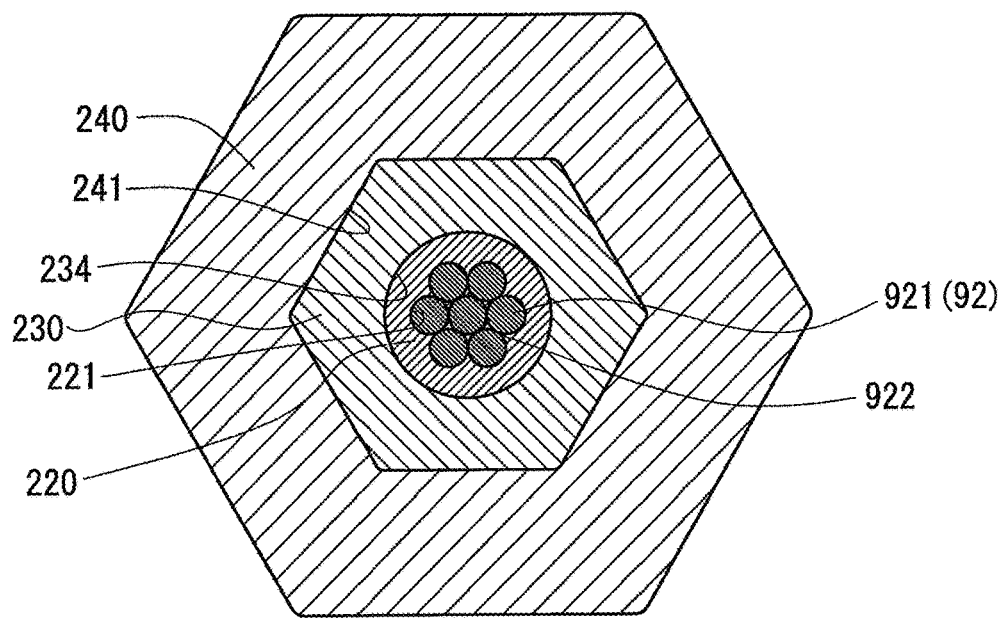
FIG. 5 is a cross-sectional view of an anchor structure of a power-transmission line of the embodiment.

An assembly component 1 of a compression type anchor clamp of the embodiment is described with mainly reference to FIG. 1 to FIG. 4 (also FIG. 5). FIG. 1 to FIG. 4 illustrate the assembly component 1 of the compression type anchor clamp before compression. FIG. 1 is a partial cross-sectional view illustrating an example of the assembly component 1 of the compression type anchor clamp of the embodiment. FIG. 2 is a cross-sectional view illustrating the assembly component 1 of the compression type anchor clamp of FIG. 1 taken along a (II)-(II) cutting-plane line.

The assembly component 1 of the compression type anchor clamp anchors a power-transmission line 9 to an insulator (not illustrated) of a steel tower, which is an anchoring target. The power-transmission line 9 includes a main line 91 and a jumper wire 95. The main line 91 includes a core portion 92 in which a plurality of (seven in this case, see FIG. 2) element wires 921 each of whose main constituent is a carbon fiber are stranded, and a conductive portion 93 (FIG. 1) in which a plurality of element wires 931 made of aluminum (Al) are stranded at an outer periphery of the core portion 92.

The assembly component 1 of the compression type anchor clamp includes a clamp main body 2 that holds the main line 91 of the power-transmission line 9, and a jumper socket 3 that holds the jumper wire 95 of the power-transmission line 9. The main line 91 and the jumper wire 95 of the power-transmission line 9 are electrically connected by contacting a main body-side connection portion 25 of the clamp main body 2 and a socket-side connection portion 32 of the jumper socket 3, which will be described later, to be electrically and mechanically connected with each other.
(Clamp Main Body)

The clamp main body 2 includes a compression holding portion 21 that is compressed with the main line 91 and holds the main line 91, and the main body-side connection portion 25 that is connected to the jumper socket 3 (FIG. 1).
(Compression Holding Portion)

The compression holding portion 21 includes, from an inner side in order, a housing tube 22, a core portion compression member 23 and a conductive portion compression member 24. The housing tube 22 houses an end portion of the core portion 92. The core portion compression member 23 is compressed and connected to the core portion 92. The conductive portion compression member 24 is compressed and connected to the conductive portion 93. A primary characteristic of the assembly component 1 of the compression type anchor clamp of the embodiment is to include the housing tube 22 that houses the core portion 92 to be interposed between the core portion 92 and the core portion compression member 23. The housing tube 22 is constituted by a specific material having a specific property.
(Housing Tube)

The housing tube 22 suppresses collapse of the core portion 92 and also connects the core portion 92 and the core portion compression member 23 when the core portion compression member 23 is compressed. The housing tube 22 is a cylindrical member that houses the core portion 92, and is continuously provided in its cylindrical direction without a gap. As the housing tube 22 is continuously provided in its cylindrical direction without a gap, when compressive force to the core portion compression member 23 acts on the housing tube 22 via the core portion compression member 23, the housing tube 22 can be deformed while moderating the compressive force and can easily enter strand grooves 922 of the core portion 92 without collapsing the core portion 92. The housing tube 22 includes an inner peripheral surface and an outer peripheral surface where an inner diameter and an outer diameter are constant in an axial direction.

As a material of the housing tube 22, pure aluminum (Al) or an Al alloy whose Vickers hardness "Hv" is less than or equal to 30 is exemplified. Provided that the Vickers hardness "Hv" of the housing tube 22 is less than or equal to 30, when compressing the core portion compression member 23, the housing tube 22 is easily deformed via the core portion compression member 23. Thus, the housing tube 22 easily moderates an action of the compressive force on the core portion 92 and also easily adheres to the core portion 92. By constituting the housing tube 22 by pure Al or an Al alloy, by an action of the compressive force on the housing tube 22, work hardening appropriate for strongly holding the core portion 92 is easily obtained. Thus, even when the core portion compression member 23 is directly compressed, the core portion 92 and the core portion compression member 23 can be connected and high tensile strength can be obtained without collapsing the core portion 92.

Although a lower limit value of the Vickers hardness "Hv" is not specifically limited, practically, it is preferable to be greater than or equal to 15. Provided that the Vickers hardness "Hv" of the housing tube 22 is greater than or equal to 15, when compressing the core portion compression member 23, inordinate deformation of the housing tube 22 can be easily suppressed. Thus, damage to the core portion 92 due to the inordinate deformation of the housing tube 22 is easily suppressed. It is particularly preferable that the Vickers hardness "Hv" is greater than or equal to 15 and less than or equal to 25, for example. Content of Al in pure Al is greater than or equal to 99.0 mass %, and 1000 series, for example, such as tempers "O" and "H14" of A1050, A1070 and A1100, defined by "JIS H 4000 (2014) 'Aluminum and aluminum alloy sheets, strips and plates'", and a sample obtained by performing a heat treatment on them may be exemplified. As the Al alloy, for example, a sample obtained by performing a heat treatment on A5052, A6061, A6063 and the like may be exemplified.

When compressing the core portion compression member 23, the housing tube 22 can, by being deformed by the compressive force via the core portion compression member 23, moderate an action of the compressive force on the core portion 92 and suppress collapse of the core portion 92. In addition, the housing tube 22 can, by entering the strand grooves 922 of the core portion 92 by the deformation, fill spaces between the core portion 92 and the housing tube 22 and adhere to the core portion 92 (see FIG. 5). Thus, a housing tube 220 that enters the strand grooves 922 can form a mechanically stronger bonding state with the core portion 92. Thus, high tensile strength can be obtained. In addition, it is expected that the housing tube 220 that enters the strand grooves 922 shows work hardening sufficient to ensure tensile strength against tensile force by the power-transmission line 9.

It is preferable that a thickness "t" of the housing tube 22 is greater than or equal to ½ and less than or equal to 3/2 of a diameter of the element wire 921 of the core portion 92. Provided that the thickness "t" of the housing tube 22 is greater than or equal to ½ of the diameter of the element wire 921, when the housing tube 22 is deformed by compressing the core portion compression member 23, it is easy to fill the strand grooves 922 of the core portion 92 by the deformed housing tube 22, and easy to fill spaces between the core portion 92 and the housing tube 22. Provided that the thickness "t" of the housing tube 22 is less than or equal to 3/2 of the diameter of the element wire 921, the housing tube 22 is easily deformed when compressing the core portion compression member 23. In addition, the housing tube 22 is not too thick, and the assembly component 1 of the compression type anchor clamp can be suppressed from becoming large. When an inclined portion 233, which will be described later, is included, the thickness "t" of the housing tube 22 means the thickness of a linear portion, not the inclined portion 233. It is particularly preferable that the thickness "t" of the housing tube 22 is greater than or equal to ½ and less than or equal to 1 of the diameter of the element wire 921. It is preferable, for example, that the thickness "t" of the housing tube 22 is greater than or equal to 1.0 mm and less than or equal to 5.0 mm, and particularly preferably, greater than or equal to 1.0 mm and less than or equal to 3.0 mm.

It is preferable that a difference "c" between an inner diameter of the housing tube 22 and a diameter of a circumcircle (expressed by a two-dot chain line in FIG. 2) of the core portion 92 is smaller. With this, when the housing tube 22 is deformed by compressing the core portion compression member 23, it is easy to fill the grooves 922 of the core portion 92 by the deformed housing tube 22, and easy to fill spaces between the core portion 92 and the housing tube 22. It is preferable that a different between the inner diameter of the housing tube 22 and the diameter of the circumcircle of the core portion 92 is less than or equal to ⅕ of the diameter of the circumcircle of the core portion 92, and particularly preferably, approximately ⅒, for example.

(Core Portion Compression Member)

The core portion compression member 23 is compressed with the core portion 92 and the housing tube 22 and holds the core portion 92. As a material of the core portion compression member 23, steel may be exemplified.

A housing hole 231 to house the end portion of the core portion 92 and the housing tube 22 is provided at a core portion 92 side (left side of FIG. 1) of the core portion compression member 23. The housing hole 231 includes an inner peripheral surface whose inner diameter is constant in an axial direction. As illustrated in FIG. 1, the core portion compression member 23 may include an outer peripheral surface whose outer diameter is constant in the axial direction at the core portion 92 side. As the core portion compression member 23, a known steel sleeve (clamp) may be used.

FIG. 3 is a partial cross-sectional view illustrating another example of the core portion compression member 23. As illustrated in FIG. 3, it is preferable that the core portion compression member 23 includes an inclined portion 233 provided at an open side of the housing hole 231 and including an inclined surface whose outer diameter decreases toward the open end. The core portion compression member 23 of FIG. 3 is substantially the same as the core portion compression member 23 of FIG. 1 except that the inclined portion 233 is included. It is preferable that an outer diameter of a front end of the inclined portion 233 is substantially the same as opposite sides of a compressor (die) that compresses the core portion compression member 23, in other words, an outer diameter in compressing the core portion compression member 23. With this, an action of inordinate compressive force on the core portion 92 at the open end of the core portion compression member 23 is easily suppressed, and collapse of the core portion 92 at the open end of the core portion compression member 23 is easily suppressed.

It is preferable that a length "d" of the inclined portion 233 (length along the axial direction) is greater than or equal to ½ times and less than or equal to twice of the outer diameter "D" of the core portion compression member 23 (FIG. 3). When the length "d" of the inclined portion 233 is greater than or equal to ½ times of the outer diameter "D" of the core portion compression member 23, it is easy to suppress inordinate compressive force to act on the core portion 92 at the open end of the core portion compression member 23. When the length "d" of the inclined portion 233 is less than or equal to twice of the outer diameter "D" of the core portion compression member 23, the length "d" of the inclined portion 233 does not become too long, the core portion compression member 23 can be sufficiently compressed along its axial direction to increase holding force, and high tensile strength is easily obtained. It is particularly preferable that the length "d" of the inclined portion 233 is greater than or equal to ½ times and less than or equal to 3/2 times of the outer diameter "D" of the core portion compression member 23.

An attaching portion 232 for connecting to the insulator of the steel tower is provided at the anchoring side (right side of FIG. 1) of the core portion compression member 23. The attaching portion 232 has a ring shape. When the core portion compression member 23 is housed inside the conductive portion compression member 24, the attaching portion 232 protrudes toward the anchoring side from an open portion of the conductive portion compression member 24 at the anchoring side.

(Conductive Portion Compression Member)

The conductive portion compression member 24 is compressed with the conductive portion 93 and the core portion compression member 23 to hold the conductive portion 93. The core portion compression member 23 is a cylindrical member that houses the end portion of the conductive portion 93 and the core portion compression member 23, and includes open portions at both ends in an axial direction. As a material of the conductive portion compression member 24, a material same as that of the element wire 931 of the conductive portion 93, specifically, pure Al or an Al alloy may be exemplified. As the conductive portion compression member 24, a known sleeve made of pure Al or an Al alloy may be used.

(Main Body-Side Connection Portion)

The main body-side connection portion 25 is electrically and mechanically connected to the socket-side connection portion 32. The main body-side connection portion 25 is provided at the end portion of the conductive portion compression member 24 at the anchoring side to extend along a plane that is substantially orthogonal to the axial direction of the conductive portion compression member 24. The main body-side connection portion 25 has a rectangular plate shape, and has a size corresponding to the socket-side connection portion 32. A plurality of through holes (not illustrated) through which bolts 4 are respectively inserted are formed in the main body-side connection portion 25.

(Jumper Socket)

The jumper socket 3 includes a compression holding portion 31 that holds the jumper wire 95 and the socket-side connection portion 32 that is connected to the clamp main body 2. As a material of the jumper socket 3, pure Al or an Al alloy may be exemplified.

(Compression Holding Portion)

The compression holding portion 31 holds the jumper wire 95 by housing the jumper wire 95 and being compressed with the jumper wire 95. The compression holding portion 31 has a cylindrical shape. The jumper wire 95 may be constituted by an Al strand.

(Socket-Side Connection Portion)

The socket-side connection portion 32 is electrically and mechanically connected to the main body-side connection portion 25. The socket-side connection portion 32 has a rectangular plate shape, and has a size corresponding to the main body-side connection portion 25. A plurality of through holes (not illustrated) through which the bolts 4 are respectively inserted are formed in the socket-side connection portion 32. The main body-side connection portion 25 and the socket-side connection portion 32 are connected by aligning the through holes of them, inserting the bolts 4 to the through holes of them, and then clamping by nuts, respectively.

FIG. 4 is a partial cross-sectional view illustrating another example of the socket-side connection portion 32. As illustrated in FIG. 4, the socket-side connection portion 32 may be bifurcated so as to sandwich the main body-side connection portion 25. The assembly component 1 of the compression type anchor clamp of FIG. 4 is substantially the same as the assembly component 1 of the compression type anchor clamp of FIG. 1 except the structure of the socket-side connection portion 32. The bifurcated portions of the socket-side connection portion 32 each has a rectangular plate shape, and has a size corresponding to the main body-side connection portion 25. A plurality of through holes (not illustrated) are formed in each of the bifurcated portions.

(Operation and Effect)

According to the above described assembly component 1 of the compression type anchor clamp, by providing the housing tube 22 between the core portion 92 and the core portion compression member 23, when compressing the core portion compression member 23, the housing tube 22 is deformed and an act of compressive force that is generated when compressing the core portion compression member 23 on the core portion 92 can be moderated. Thus, even when the core portion compression member 23 is directly compressed, the core portion 92 can be suppressed from being collapsed.

Further, when compressing the core portion compression member 23, the housing tube 22 enters the strand grooves 922 of the core portion 92 to fill the strand grooves 922, and the housing tube 22 is deformed to fill spaces between the core portion 92 and the core portion compression member 23 without collapsing the core portion 92. With this, the core portion 92 and the housing tube 22 can be adhered, and as the housing tube 22 that enters the strand grooves 922 can form a mechanically stronger bonding state with the core portion 92, high tensile strength can be obtained.

The assembly component 1 of the compression type anchor clamp is small. This is because, by using the assembly component 1 of the compression type anchor clamp, the core portion 92 and the conductive portion 93 can be held by being separately compressed. Thus, it is unnecessary to form the conductive portion compression member 24 to be longer in order to retain holding forces for the core portion 92 and the conductive portion 93 only by the conductive portion compression member 24.

(Anchor Structure of Power-Transmission Line)

An anchor structure of the power-transmission line of the embodiment is described mainly with reference to FIG. 5 (also FIGS. 1 to 3, 6A to 6D and the like). The anchor structure of the power-transmission line includes the main line 91 of the power-transmission line 9 and the compression type anchor clamp that is compressed with the end portion of the main line 91 and is anchored to the insulator of the steel tower. The compression type anchor clamp is obtained by compressing the above described assembly component 1 of the compression type anchor clamp. FIG. 5 corresponds to a state after separately compressing the core portion compression member 23 and the conductive portion compression member 24 illustrated in FIG. 2. As will be described later, a housing tube 220, a core portion compression member 230 and a conductive portion compression member 240 of FIG. 5 are obtained by compressing the housing tube 22, the core portion compression member 23 and the conductive portion compression member 24, respectively.

(Power-Transmission Line)

(Main Line)

The main line 91 is installed between steel towers and supplies electric power generated at a power plant to the power-transmission line 9. As described above, the main line 91 includes the core portion 92 in which the seven element wires 921 each of whose main constituent is a carbon fiber are stranded, and the conductive portion 93 in which the plurality of element wires 931 made of Al are stranded at the outer periphery of the core portion 92. As the main line 91, typically, a carbon fiber-cored aluminum cable is exemplified. The carbon fiber-cored aluminum cable includes a core portion made of a CFRP strand and a conductive portion in which a plurality of Al wires are stranded at an outer periphery of the core portion. The CFRP strand is configured by stranding a plurality of element wires made of Carbon Fiber Reinforced Plastic (CFRP) constituted by carbon fiber and resin. As the CFRP strand, for example, a carbon fiber composite cable (CFCC (registered trademark of TOKYO ROPE MFG. CO., LTD)) may be used.

(Compression Type Anchor Clamp)

The compression type anchor clamp includes the housing tube 220, the core portion compression member 230 and the conductive portion compression member 240 illustrated in FIG. 5.

(Housing Tube)

The housing tube 220 is formed to fill the strand grooves 922 of the core portion 92, and includes an inner peripheral surface 221 that adheres to the core portion 92 along an outer peripheral outline of the core portion 92. There is substantially no space between the inner peripheral surface 221 of the housing tube 220 and the core portion 92. The housing tube 220 is the compressed housing tube 22 included in the above described assembly component 1 obtained by compressing the core portion compression member 23 included in the above described assembly component 1 of the compression type anchor clamp. An outer peripheral surface of the housing tube 220 has a shape that extends along an inner peripheral surface of the core portion compression member 23, and the outer peripheral outline (cross-sectional shape) of the housing tube 220 here is a circular (cylindrical) shape.

(Core Portion Compression Member)

The core portion compression member 230 includes an inner peripheral surface 234 that adheres to the housing tube 220 along the outer peripheral outline (circular shape) of the housing tube 220. There is substantially no space between the inner peripheral surface 234 of the core portion compression member 230 and the outer peripheral surface of the housing tube 22. The core portion compression member 230 is obtained by compressing the core portion compression member 23 included in the above described assembly component 1 of the compression type anchor clamp. An outer peripheral surface of the core portion compression member 230 has a shape corresponding to a shape of the compressor that compresses the core portion compression member 23, and the core portion compression member 230 here has a hexagonal cross-sectional shape.

The inclined portion 233 may be formed at an open side end portion of the core portion compression member 230. The core portion compression member 23 included in the above described assembly component 1 of the compression type anchor clamp includes the inclined portion 233 (FIG. 3).

The core portion compression member 230 includes a plurality of compression traces 235 (FIG. 6D, for example) that are formed to align in an axial direction of the core portion compression member 230 at its outer peripheral surface. The compression trace 235 is substantially continuously formed in a cylindrical direction of the core portion compression member 230. It is preferable that the number of the compression traces 235 is four or more, for example. As will be described later in detail, when the number of times of compression in the constructing process is "n", the number of the compression traces 235 becomes "n". In other words, when the number of the compression traces 235 is four or more, it means that the number of times of compression in the construction process is four or more, and it is easy to suppress collapse of the core portion 92.

(Conductive Portion Compression Member)

The conductive portion compression member 240 includes an inner peripheral surface 241 that adheres to the core portion compression member 230 along the outer peripheral outline (hexagonal shape) of the core portion compression member 230. There is substantially no space between the inner peripheral surface 241 of the conductive portion compression member 240 and the outer peripheral surface of the core portion compression member 230. The conductive portion compression member 240 is obtained by compressing the conductive portion compression member 24 included in the above described assembly component 1 of the compression type anchor clamp. An outer peripheral surface of the conductive portion compression member 240 has a shape corresponding to a shape of a compressor that compresses the conductive portion compression member 240, and the conductive portion compression member 240 here has a hexagonal cross-sectional shape.

(Operation and Effect)

According to the above described anchor structure of the power-transmission line, as all of the strand grooves 922 of the core portion 92 and the housing tube 220, the housing tube 220 and the core portion compression member 230, and the core portion compression member 230 and the conductive portion compression member 240 are adhered to each other without spaces and without collapsing the core portion 92, the bonding strength between the power-transmission line 9 and the compression type anchor clamp is high.

(Method of Constructing Compression Type Anchor Clamp)

In a method of constructing a compression type anchor clamp, the power-transmission line 9 is anchored to an insulator of a steel tower using the above described assembly component 1 of the compression type anchor clamp. The method of constructing the compression type anchor clamp includes a preparation step, a housing tube housing step, a core portion connecting step and a conductive portion connecting step.

(Preparation Step)

In the preparation step, the above described assembly component 1 of the compression type anchor clamp is prepared. Preparation of the housing tube 22 may be performed by preparing a raw material tube made of pure Al or an Al alloy, and performing a heat treatment on the raw material tube. The raw material tube may be prepared by extruding, drawing, casting, cutting and the like. In other words, as the raw material tube, an extruded tube formed by extruding, a drawn tube formed by drawing, a cast tube formed by casting, a processed tube obtained by cutting the extruded tube, the drawn tube, the cast tube or a bar, and the like may be used. The Vickers hardness "Hv" of any of these raw material tubes is higher than 30. Provided that the Vickers hardness "Hv" of the raw material tube before the heat treatment is higher than 30, when preparing the raw material tube by cutting a long tube to a predetermined length, a cut edge of the raw material tube does not easily deform. Thus, the housing tube 22 with an open end whose deformation is small is easily obtained.

The housing tube 22 whose Vickers hardness "Hv" is less than or equal to 30 is manufactured by performing a heat treatment on the raw material tube. A temperature of the heat treatment may be, although depending on a kind of pure Al or an Al alloy, for example, greater than or equal to 350° C. and less than or equal to 420° C. A period for the heat treatment may be, for example, greater than or equal to one hour and less than or equal to two hours.

(Housing Tube Housing Step)

In the housing tube housing step, the end portion of the core portion 92 and the housing tube 22 are housed in the housing hole 231 of the core portion compression member 23. First, the end portion of the main line 91 is stepwisely peeled to expose the end portion of the core portion 92. Next, the end portion of the core portion 92 and the housing tube 22 may be housed in the housing hole 231 of the core portion compression member 23 after housing the exposed end portion of the core portion 92 in the housing tube 22, or the exposed end portion of the core portion 92 may be housed in the housing tube 22 after housing the housing tube 22 in the housing hole 231.

(Core Portion Connecting Step)

In the core portion connecting step, by compressing the core portion compression member 23, the core portion 92 and the core portion compression member 23 are connected. By the compression of the core portion compression member 23, the housing tube 22 is deformed via the core portion compression member 23 and causes the housing tube 22 to fit in the strand grooves 922 of the core portion 92 without collapsing the core portion 92. As such, spaces between the core portion 92 and the housing tube 22 are filled by the housing tube 22. The core portion compression member 23 is compressed such that the core portion compression member 23 has, for example, a hexagonal cross-sectional shape (FIG. 5). For this compression, a commercial 100 ton compressor may be used.

Compression of the core portion compression member 23 may be separately performed for a plurality of times in the axial direction of the core portion compression member 23. As commercial compressors, a 100 ton compressor and a 200 ton compressor are included. A width of a compression die of a compressor is determined based on the outer diameter of the core portion compression member 23. For example, when the outer diameter of the core portion compression member 23 is 24 mm to 28 mm, a width of a compression die of a 100 ton compressor is 30 mm, and a width of a compression die of a 200 ton compressor is 60 mm. When the outer diameter of the core portion compression member 23 is 30 mm to 34 mm, a width of a compression die of a 100 ton compressor is 25 mm, and a width of a compression die of a 200 ton compressor is 50 mm. By using the commercial 100 ton compressor in the compression of the core portion compression member 23, a width of each compression can be made small, and a damage to the core portion 92 is easily suppressed. The narrower the width of each compression, the smaller the degree of deformation of the housing tube 22 in each compression becomes and smaller a spread of the housing tube 22 in the axial direction becomes. Thus, force of an action in the axial direction of the core portion by the deformation of the housing tube 22 can be made small.

For example, when the outer diameter of the core portion compression member 23 is 26 mm, and a length of the housing hole 231 of the core portion compression member 23 to be compressed is 130 mm, it is preferable that the number of times of compression (the number of divided times in the axial direction) is determined to perform 6 times of compression in total by using a 100 ton compressor with 30 mm width as follows, compared with a case in which 3 times of compression in total is performed by using a 200 ton compressor with 60 mm width. Among the three times of compression in each of which the compression is performed using the 200 ton compressor with 60 mm width, 20 mm of the first compression are overlapped in the second compression, and 30 mm of the second compression are overlapped in the third compression. Among the six times of compression, in each of which the compression is performed using the 100 ton compressor with 30 mm width, 10 mm of a preceding compression are overlapped in each of the second to sixth compressions.

Figure 6A:
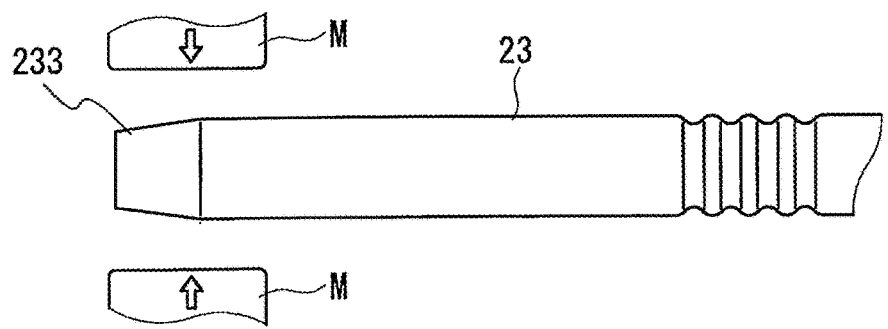
FIG. 6A is a view for describing a step of a method of constructing the compression type anchor clamp of the embodiment.

Although the compression may be performed in order from an anchoring side toward an open side of the core portion compression member 23, as illustrated in FIG. 6A to 6D, it is preferable that the compression is performed in an opposite order, from the open side (left side of FIG. 1 and FIG. 6A) toward the anchoring side (right side of FIG. 1 and FIG. 6A). With this, even when the length of the housing hole 231 of the core portion compression member 23 is different, it is easy to maintain a constant compression of the front end. By compressing the open end of the core portion compression member 23 first, as the core portion 92 is compressed constant at the open end of the core portion compression member 23 and inordinate compressive force is suppressed from acting on the core portion 92, collapse of the core portion 92 at the open end of the core portion compression member 23 can be suppressed.

It is preferable that each compressing zone partially overlaps another zone in the axial direction of the core portion compression member 23. With this, a non-compressed area is not formed over the axial direction of the core portion compression member 23. A length of an overlapping area "Ov" of the compressing zones may be, for example, approximately greater than or equal to $\frac{1}{5}$ and less than or equal to $\frac{2}{5}$ of each of the compressing zones (compression widths), furthermore, may be greater than or equal to $\frac{1}{4}$ and less than or equal to $\frac{1}{3}$. Typically, the length of the overlapping area "Ov" of the compressing zones is $\frac{1}{3}$ of the compression width. When the number of times of compression is "n" at this time, "n" of the compression traces 235 (FIG. 6D) are formed at the outer periphery of the core portion compression member 23 to align in the axial direction. For example, when the number of times of compression is four, four of the compression traces are formed. For example, as illustrated in FIG. 6A to 6D, when the compression is performed from the open side toward the anchoring side in order, one compression trace 235 is formed by the first compression, and thereafter, one compression trace 235 is formed by each compression. When the compressing zone (compression width) is equal, a length of an interval between the compression traces 235 at one portion becomes longer than those of other intervals each between the compression traces 235. The portion where the interval is longer is a portion that is compressed first. This is because, in the second compression and the compressions thereafter, a compression trace is not formed at an overlapping side as the core portion compression member 23 at the overlapping area "Ov" of the compressing zone is not substantially compressed. The length between each set of the compression traces 235 at the other portions has an equal interval.

Figure 6B:
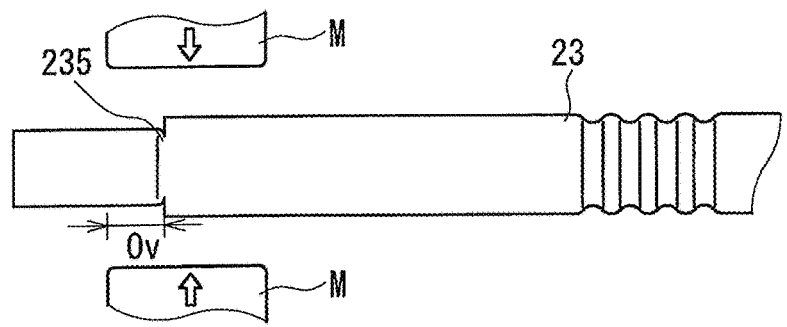
FIG. 6B is a view for describing a step of the method of constructing the compression type anchor clamp of the embodiment.
Figure 6C:
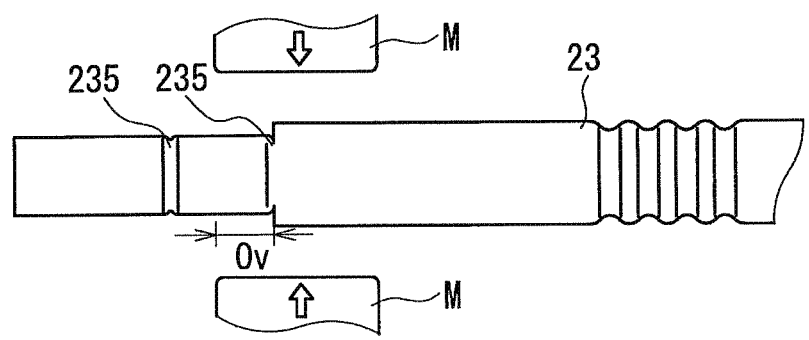
FIG. 6C is a view for describing a step of the method of constructing the compression type anchor clamp of the embodiment.
Figure 6D:
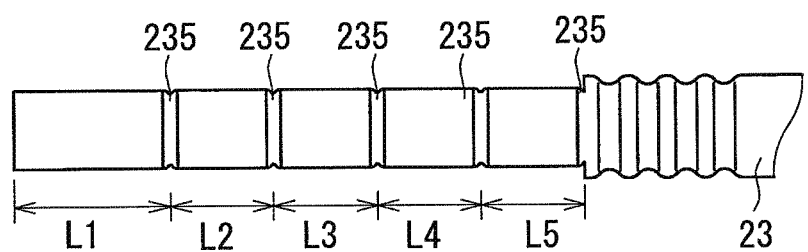
FIG. 6D is a view for describing a step of the method of constructing the compression type anchor clamp of the embodiment.

With reference to FIG. 6A to FIG. 6D, an example is described in which the compression is performed five times in total from the open side (left side of the drawings) toward the anchoring side (right side of the drawings) of the core portion compression member 23 in order. A compression width (compressing zone) of a compressor M is equal in each compression, and an overlapping area "Ov" is also equal in each compression. First, as illustrated in FIG. 6A, the open end of the core portion compression member 23 is compressed. Then, as illustrated in FIG. 6B, one compression trace 235 is formed by an end portion of the compressor M at the anchoring side. Next, a second compression is performed such that the compression width (compressing zone) of the compressor M partially overlaps the first compressed area. In such a case, an overlapped portion of the core portion compression member 23 is not substantially compressed by the compressor M. Thus, as illustrated in FIG. 6C, one compression trace is formed at a side that is opposite of an overlapping side of the compressor M. When similarly performing compression in order, as illustrated in FIG. 6D, five compression traces 235, which is the same as the number of times of compression (five times in total) are formed. At this time, among intervals L1 to L5 between the compression traces 235, the interval L1 at the open side that is compressed first is the longest, and the intervals L2 to L5 other than the interval L1 are shorter than the interval L1 and are equal.

When the core portion compression member 23 includes the inclined portion 233 at the open side, as illustrated in FIG. 6A to 6D, it is preferable that compression is separately performed for a plurality of times in the axial direction of the core portion compression member 23 including the inclined portion 233 from an inclined portion 233 side toward the anchoring side. By providing the inclined portion 233, inordinate compressive force can be suppressed from acting on the core portion 92 at the open end of the core portion compression member 23, and collapse of the core portion 92 at the open end of the core portion compression member 23 can be suppressed. By compressing from the inclined portion 233 side toward the anchoring side, as the inclined portion 233 is compressed first, even when the length of the housing hole 231 of the core portion compression member 23 is different, it is easy to keep a compression state of the front end always constant and compression can be performed at a same state every time.

It is preferable that a compressibility ratio of the core portion compression member 23 is greater than or equal to 5% and less than or equal to 15%. When the compressibility ratio is greater than or equal to 5%, by including the housing tube 22, the core portion 92 and the core portion compression member 23 can be sufficiently connected. When the compressibility ratio is less than or equal to 15%, by including the housing tube 22, compressive force that acts on the core portion 92 does not become too large, and collapse of the core portion 92 is easily suppressed. It is particularly preferable that the compressibility ratio is greater than or equal to 10% and less than or equal to 15%. The compressibility ratio is defined as, compressibility ratio=((A−B)/A)×100. "A" is defined as a total sectional area of the core portion 92, the housing tube 22 and the core portion compression member 23 before compression (see FIG. 2). "B" is defined as a total sectional area of the core portion 92, the housing tube 220 and the core portion compression member 230 after the compression (see FIG. 5).

(Conductive Portion Connecting Step)

In the conductive portion connecting step, by compressing the conductive portion compression member 24, an end portion of the conductive portion 93 and the core portion compression member 230 (FIG. 5) are connected with the conductive portion compression member 24. First, the end portion of the conductive portion 93 and the core portion compression member 230 are housed in the conductive portion compression member. Then, the conductive portion compression member 24 is compressed to connect the end portion of the conductive portion 93 with the conductive portion compression member 24. The conductive portion compression member 24 is compressed such that the conductive portion compression member 24 has, for example, a hexagonal cross-sectional shape in this compression (FIG. 5). For this compression, a commercial compressor may be used.

(Operation and Effect)

According to the above described method of constructing the compression type anchor clamp, by using the housing tube 22, while suppressing collapse of the core portion 92, the core portion 92 and the core portion compression member 23 can be strongly connected via the housing tube 22. Thus, the anchor structure of the power-transmission line in which bonding strength between the power-transmission line and the compression type anchor clamp is high can be constructed.

Test Example 1

Occurrence of collapse of the core portion 92 and tensile strength in the assembly component 1 of the compression type anchor clamp described above with reference to FIG. 1 based mainly on a difference in the Vickers hardness "Hv" of the housing tube 22 were examined.

(Sample No. 1-1)

As a sample No. 1-1, one core portion 92, two housing tubes 22 and two core portion compression members 23 were prepared.

As the core portion 92, a strand in which seven element wires 921, each constituted by carbon fiber and epoxy resin, were stranded was used. As the core portion compression member 23, a steel sleeve used for a compression type anchor clamp of the ACSR was used. In this core portion compression member 23, an inclined portion was not formed at an open side.

The housing tube 22 was constituted by pure Al whose Vickers hardness "Hv" was 20. The housing tube 22 was manufactured by performing a heat treatment of 420° C. for two hours on a raw material tube (Vickers hardness "Hv": 31) made of pure Al (A1070-H14 material defined by JIS), and naturally cooling. Specification of the housing tube 22 before compression was as follows.

Thickness "t": 1.8 mm (1.38/2 times of the diameter of the element wire 921 of the core portion 92 (the diameter of the element wire: φ2.6 mm))

Difference "c" between the inner diameter of the housing tube 22 (φ8.4 mm) and the diameter of the circumcircle of the core portion 92 (φ7.8 mm): 0.6 mm (less than or equal to 1/10 times of the diameter of the circumcircle of the core portion 92)

Length: 130 mm

Each end portion of the core portion 92 is housed in the respective housing tube 22, and further, these are housed in the housing hole 231 of the respective core portion compression member 23 (whose length was 130 mm). Then, each of the core portion compression members 23 was compressed by a commercial 100 ton compressor such that its outer peripheral outline became a hexagonal shape. The compression condition was as follows.

(Compression Conditions)

Compression order: an order from the anchoring side toward the open side

The number of times of compression: six times (among the six times with 30 mm width, 10 mm of a preceding compression were overlapped in each of second to sixth compressions)

Compressibility ratio: 10.9%

(Sample No. 1-2)

A sample No. 1-2 was manufactured similarly as the sample No. 1-1 except that the housing tube 22 was constituted by pure Al whose Vickers hardness "Hv" was 24.4. The housing tube 22 was manufactured by performing a heat treatment of 370° C. for two hours on a raw material tube (Vickers hardness "Hv": 31) made of pure Al (A1070-H14 material defined by JIS), and naturally cooling.

(Sample No. 1-3)

A sample No. 1-3 was manufactured similarly as the sample No. 1-1 except that the housing tube 22 was constituted by pure Al (A1070-H14 material defined by JIS) whose Vickers hardness "Hv" was 30.1.
(Evaluation of Occurrence of Collapse)

Each of the samples was then evaluated for the occurrence of collapse. Here, a cross-section of the core portion 92 of each sample was confirmed by viewing. If the degree of deformation of the element wires 921 of the core portion 92 was relatively large, it was determined that collapse had occurred in the sample.

Figure 7:
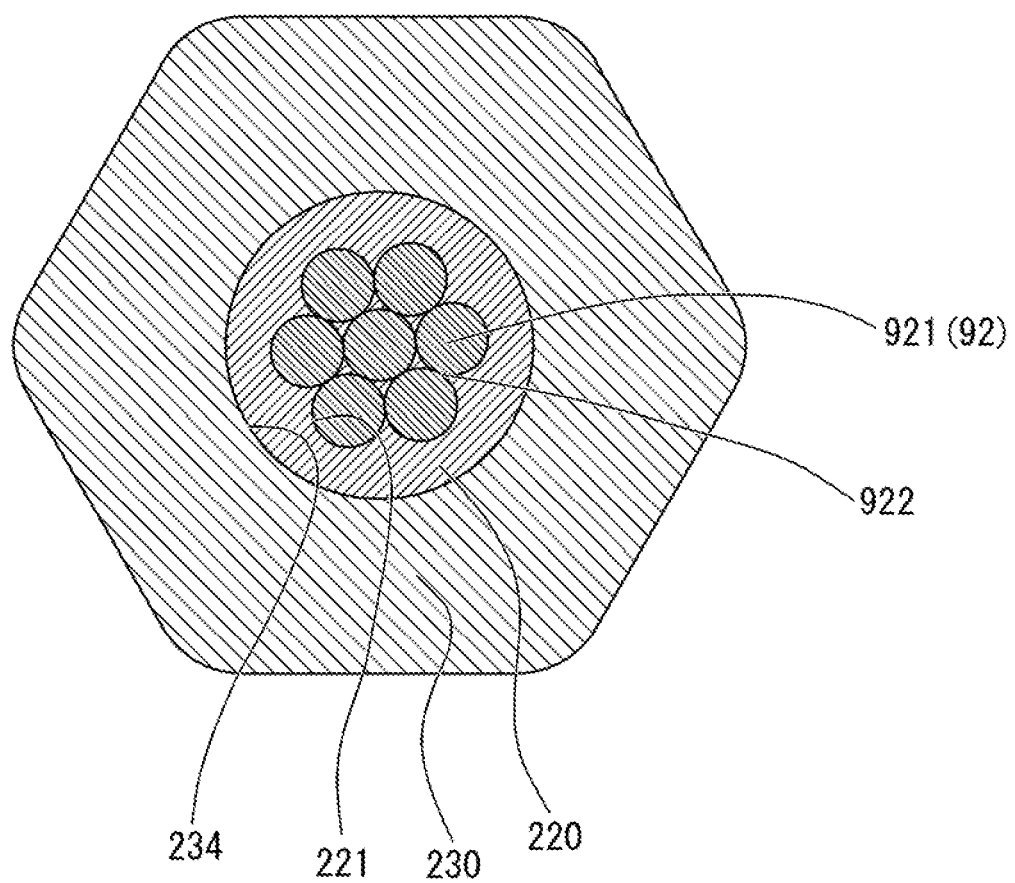
FIG. 7 is a photograph illustrating a cross-section of a sample No. 1-1.
Figure 8:
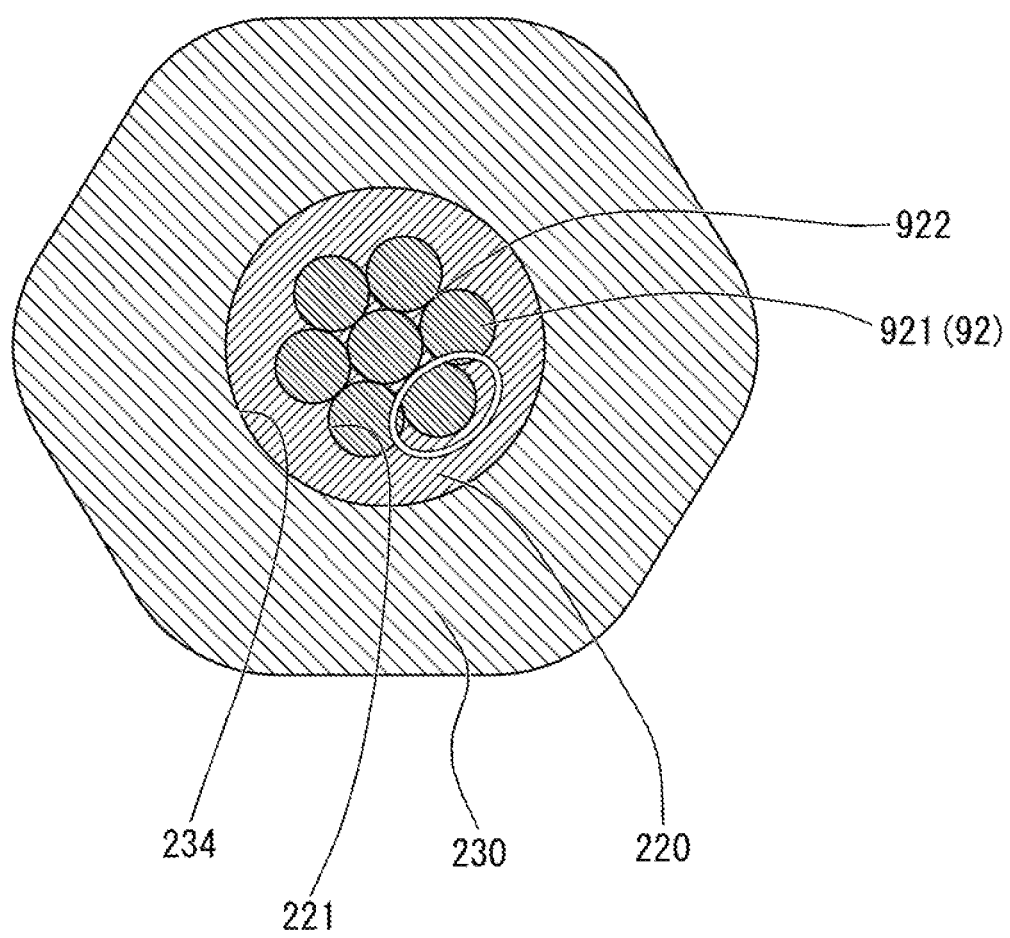
FIG. 8 is a photograph illustrating a cross-section of a sample No. 1-3.

As a result, the core portions 92 of the sample No. 1-1 and the sample No. 1-2 were not collapsed. The core portion 92 of the sample No. 1-3 was collapsed. Among these samples, a cross-sectional photograph of the sample No. 1-1 is illustrated in FIG. 7, and a cross-sectional photograph of the sample No. 1-3 is illustrated in FIG. 8. As illustrated in FIG. 7, it can be understood that, in the sample No. 1-1, the housing tube 220 did not collapse the core portion 92 and the inner peripheral surface 221 of the housing tube 220 was formed to fill the strand grooves 922 of the core portion 92 to adhere to the core portion 92 along the outer peripheral outline of the core portion 92. Further, it can be understood that the inner peripheral surface 234 of the core portion compression member 230 adhered to the housing tube 220 along the outer peripheral outline of the housing tube 220. On the other hand, it can be understood that, in the sample No. 1-3, as illustrated in FIG. 8 (in particular, an area surrounded by an ellipse line), the core portion 92 was largely deformed and was collapsed.
(Evaluation of Tensile Strength)

Tensile strength was measured by conducting a tensile test on each of the samples. Here, the core portion compression members 230 that were compressed and connected at both ends of the core portion 92 were held and pulled. In other words, the conductive portion compression member 24 of the assembly component 1 of the compression type anchor clamp was not used.

As a result, the tensile strength of the sample No. 1-1 was 87.8 kN, and the tensile strength of the sample No. 1-2 was 70.9 kN. Meanwhile, the tensile strength of the sample No. 1-3 was 66.7 kN. As such, it can be understood that the tensile strength of the sample No. 1-1 or 1-2, in which the Vickers hardness "Hv" of the housing tube 22 was less than or equal to 30, was larger than that of the sample No. 1-3 whose Vickers hardness "Hv" exceeded 30.

Test Example 2

Tensile strength of the core portion 92 after compressing the core portion compression member 23 based mainly on a difference in thickness of the housing tube 22 before compression was examined by an evaluation method similar to test example 1.
(Sample No. 2-1)

The housing tube 22 of a sample No. 2-1 was constituted by pure Al whose Vickers hardness "Hv" was 21.4. The housing tube 22 was prepared similarly as that of the sample No. 1-1. Specification of the housing tube 22 before compression was as follows.

Thickness "t": 2.4 mm (1.5/2 times of the diameter of the element wire 921 of the core portion 92 (the diameter of the element wire: φ3.2 mm))

Difference "c" between the inner diameter of the housing tube 22 (910.2 mm) and the diameter of the circumcircle of the core portion 92 (99.6 mm): 0.6 mm (less than or equal to 1/10 times of the diameter of the circumcircle of the core portion 92)

Length: 140 mm

A length of the housing hole 231 of the core portion compression member 23 of the sample No. 2-1 was 140 mm. The compression condition of the sample No. 2-1 was as follows.
(Compression Conditions)

Compression order: an order from the anchoring side toward the open side

The number of times of compression: nine times (among the ninth times with 25 mm width, 10 mm of a preceding compression were overlapped in each of second to eighth compressions, and 15 mm of the eighth compression were overlapped in ninth compression)

Compressibility ratio: 11.8%
(Sample No. 2-2)

A sample No. 2-2 was manufactured similarly as the sample No. 2-1 except following points (a) to (c).

(a) Vickers hardness "Hv" of the housing tube 22 was 19.9.

(b) The thickness "t" of the housing tube 22 before compression was 1.9 mm, which was 1.18/2 times of the diameter of the element wire 921 of the core portion 92.

(c) The compressibility ratio was 12.0%.
(Sample No. 2-3)

A sample No. 2-3 was manufactured similarly as the sample No. 2-1 except following points (a) to (c).

(a) Vickers hardness "Hv" of the housing tube 22 was 22.2.

(b) The thickness "t" of the housing tube 22 before compression was 2.9 mm, which was 1.81/2 times of the diameter of the element wire 921 of the core portion 92.

(c) The compressibility ratio was 11.7%.
(Evaluation of Tensile Strength)

The tensile test similarly as test example 1 was conducted on each of the samples to measure the tensile strength. As a result, the tensile strength of the sample No. 2-1 was 138.6 kN, the tensile strength of the sample No. 2-2 was 110.1 kN, and the tensile strength of the sample No. 2-3 was 128.5 kN.

Test Example 3

Tensile strength of the core portion compression member 23 based mainly on a difference in the compressibility ratio was examined.
(Sample No. 3-1)

For a sample No. 3-1, a sample same as the sample No. 2-1 was used. In other words, the compressibility ratio was 11.8%.
(Sample No. 3-2)

A sample No. 3-2 has a structure similarly as the sample No. 3-1 (No. 2-1) except that the Vickers hardness "Hv" was 20.2 and the compressibility ratio was 4.7%.
(Evaluation of Tensile Strength)

Figure 9:
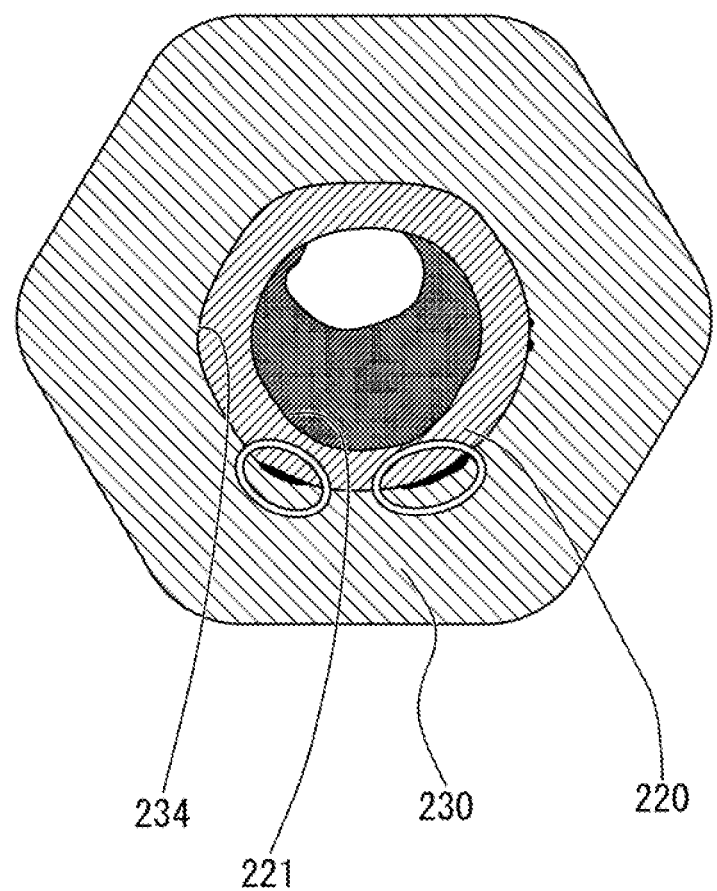
FIG. 9 is a photograph illustrating a cross-section of a sample No. 3-2.

The tensile test similarly as test example 1 was conducted on each of the samples to measure the tensile strength. As a result, the tensile strength of the sample No. 3-1 was 138.6 kN and the tensile strength of the sample No. 3-2 was 34.8 kN. Among these samples, a cross-sectional photograph of the sample No. 3-2 is illustrated in FIG. 9. As illustrated in FIG. 9, the inner peripheral surface 221 of the housing tube 220 does not extend along the outer peripheral outline of the core portion (not illustrated in FIG. 9), and has a substantially circular shape of before compression. The reason that the tensile strength of the sample No. 3-2 is small is that, as the compressibility ratio is low, as illustrated in FIG. 9, the housing tube 220 could not be fitted in to fill the strand grooves of the core portion. Thus, the inner peripheral surface 221 of the housing tube 220 could not be adhered to the core portion along the outer peripheral outline of the core portion, and spaces were formed between the housing tube 220 and the core portion. As illustrated in FIG. 9 (in particular, areas surrounded by ellipse lines, respectively), it can be understood that spaces were also formed between the housing tube 220 and the core portion compression member 230 in the sample No. 3-2.

Test Example 4

Tensile strength mainly based on whether the inclined portion 233 of the core portion compression member 23 was included and a difference in the length "d" of the inclined portion 233 was evaluated.
(Sample No. 4-1)
A sample No. 4-1 was manufactured similarly as the sample No. 1-1 except following points (a) to (d).
(a) Vickers hardness "Hv" of the housing tube 22 was 17.9.
(b) The inclined portion 233 was included at the open side end portion of the core portion compression member 23, and the length "d" of the inclined portion 233 was 1.7/2 of the outer diameter "D" of the core portion compression member 23.
(c) The compression order was from the open side toward the anchoring side in order.
(d) Compressibility ratio was 11.9%.
(Sample No. 4-2)
A sample No. 4-2 was manufactured similarly as the sample No. 4-1 except following points (a) to (d).
(a) Vickers hardness "Hv" of the housing tube 22 was 18.
(b) The length of the housing tube 22 was 120 mm.
(c) The length of the housing hole 231 of the core portion compression member 23 was 120 mm.
(d) The length "d" of the inclined portion 233 was 0.8/2 of the outer diameter "D" of the core portion compression member 23.
(Sample No. 4-3)
A sample No. 4-3 was manufactured similarly as the sample No. 4-1 except following points (a) to (d).
(a) Vickers hardness "Hv" of the housing tube 22 was 19.
(b) The length of the housing tube 22 was 140 mm.
(c) The length of the housing hole 231 of the core portion compression member 23 was 140 mm.
(d) The length "d" of the inclined portion 233 was 2.5/2 of the outer diameter "D" of the core portion compression member 23.
(e) The number of times of compression was seven (among the seventh times with 30 mm width, 10 mm of a preceding compression were overlapped in each of second to sixth, and 20 mm of the sixth compression were overlapped in seventh compression).
(Sample No. 4-4)
A sample No. 4-4 was manufactured similarly as the sample No. 4-1 except following points (a) to (f).
(a) The Vickers hardness "Hv" of the housing tube 22 was 18.1.
(b) The length of the housing tube 22 was 110 mm.
(c) The length of the housing hole 231 of the core portion compression member 23 was 110 mm.
(d) The compression order was from the open side toward the anchoring side in order.
(e) The number of times of compression was five (among the fifth times with 30 mm width, 10 mm of a preceding compression were overlapped in each of second to fifth).
(f) The compressibility ratio was 11.9%.

In other words, the inclined portion was not formed in the core portion compression member 23 of the sample No. 4-4.
(Evaluation of Tensile Strength)
The tensile test similarly as test example 1 was conducted on each of the samples to measure the tensile strength. As a result, the tensile strength of the sample No. 4-1 was 80.4 kN, the tensile strength of the sample No. 4-2 was 79.7 kN, the tensile strength of the sample No. 4-3 was 85.7 kN and the tensile strength of the sample No. 4-4 was 68.1 kN. As such, it can be understood that the tensile strength of each of the samples No. 4-1 to 4-3 in which the core portion compression member 23 included the inclined portion 233, was larger than that of the sample No. 4-4 in which the inclined portion was not included. Further, it can be understood that longer the length "d" of the inclined portion 233 was, larger the tensile strength became.

Test Example 5

Figure 10A:
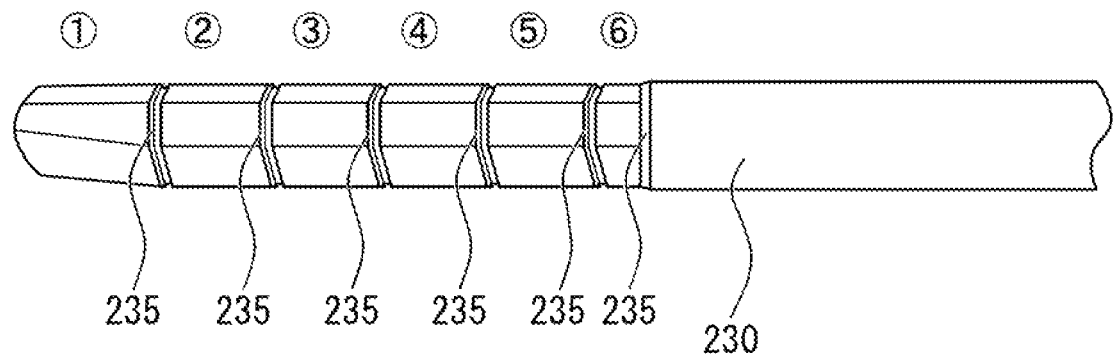
FIG. 10A is a photograph illustrating an appearance of a core portion compression member which is compressed from its open side toward an anchoring side in order.
Figure 10B:
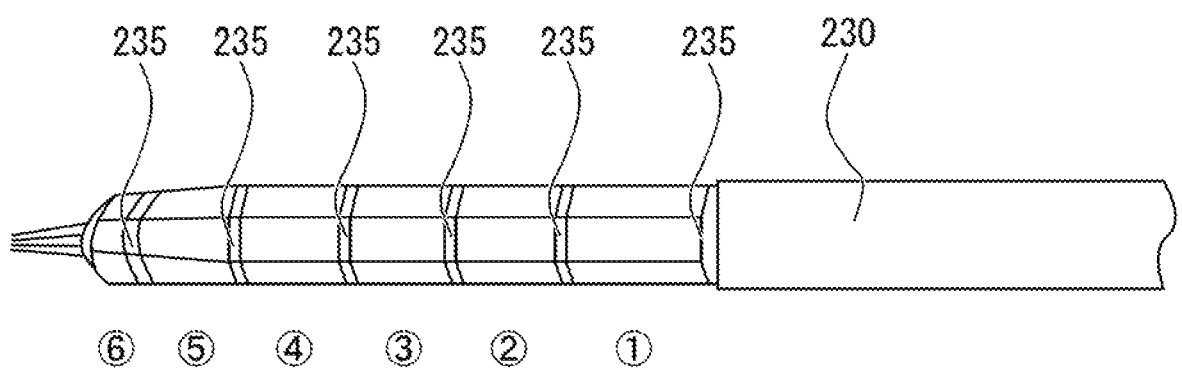
FIG. 10B is a photograph illustrating an appearance of a core portion compression member which is compressed from its anchoring side toward an open side in order.

Tensile strength based mainly on the compression order of the core portion compression member 23 was evaluated.
(Sample No. 5-1)
A sample No. 5-1 was manufactured similarly as the sample No. 4-1 except that the Vickers hardness "Hv" of the housing tube 22 was 25.8, and the compressibility ratio was 9.7%. In other words, for the sample No. 5-1, the compression order was from the open side toward the anchoring side, and the number of times of compression was six (among the six times of compression with 30 mm width, 10 mm of a preceding compression were overlapped in each of second to sixth compressions).
(Sample No. 5-2)
A sample No. 5-2 was manufactured similarly as the sample No. 5-1 except that the Vickers hardness "Hv" of the housing tube 22 was 26.4, and the compression order was from the anchoring side toward the open side.
(Evaluation of Tensile Strength)
The tensile test similarly as test example 1 was conducted on each of the samples to measure the tensile strength. As a result, the tensile strength of the sample No. 5-1 was 87.5 kN and the tensile strength of the sample No. 5-2 was 75.9 kN. As such, it can be understood that the tensile strength is larger in the sample No. 5-1 in which the compression order was from the open side toward the anchoring side, than that in the sample No. 5-2 whose order is opposite.
(Observation of Appearance of Core Portion Compression Member)
FIG. 10A illustrates a photograph of an appearance of the core portion compression member 230 when compression was performed from the open side toward the anchoring side in order, and FIG. 10B illustrates a photograph of an appearance of the core portion compression member 230 when compression was performed from the anchoring side toward the open side in order. Numbers each surrounded by a circle in the drawings mean orders of compression.
As illustrated in FIG. 10A and FIG. 10B, it can be understood that the number of the compression traces 235 is six, which is the same as the number of times of compression (six times). Further, it can be understood that an interval between the compression traces 235 becomes the longest at either of the open side and the anchoring side which is compressed first. In other words, when the compression was performed from the open side toward the anchoring side in order, as illustrated in FIG. 10A, the open side becomes the longest, and when the compression was performed from the anchoring side toward the open side in order, as illustrated in FIG. 10B, the anchoring side becomes the longest.

Test Example 6

Tensile strength based mainly on a difference in the number of times of compression (compression width) of the core portion compression member 23 was evaluated.
(Sample No. 6-1)
A sample No. 6-1 was manufactured similarly as the sample No. 1-1. In other words, the number of times of compression was 6 for the sample No. 6-1. For this compression, a commercial 100 ton compressor was used.
(Sample No. 6-2)
A sample No. 6-2 was manufactured similarly as the sample No. 6-1 except that the Vickers hardness "Hv" of the housing tube 22 was 18.4, and the number of times of compression was three times (among the three times with 60 mm width in total, 20 mm of first compression were overlapped in second compression and 30 mm of the second compression were overlapped in third compression). In other words, each of the compression widths of in the sample No. 6-2 was broader than that of the sample No. 6-1. For this compression, a commercial 200 ton compressor was used.
(Evaluation of Tensile Strength)
The tensile test similarly as test example 1 was conducted on each of the samples to measure the tensile strength. As a result, the tensile strength of the sample No. 6-1 was 87.8 kN and the tensile strength of the sample No. 6-2 was 24.1 kN. As such, it can be understood that the tensile strength of the sample No. 6-1 in which the number of times of compression (compression width is small) is larger than that of the sample No. 6-2 in which the number of times of compression is smaller (compression width is large).

The above described assembly component of the compression type anchor clamp is small, and even when the core portion compression member that houses the core portion is directly compressed, the core portion does not collapse and high tensile strength can be obtained.

In the above described anchor structure of the power-transmission line, the bonding strength between the power-transmission line and the compression type anchor clamp is high.

By the above described method of constructing the compression type anchor clamp, the anchor structure of the power-transmission line in which bonding strength between the power-transmission line and the compression type anchor clamp is high can be formed.

NUMERALS 1 assembly component of compression type anchor clamp
2 clamp main body
21 compression holding portion
22, 220 housing tube, 221 inner peripheral surface
23, 230 core portion compression member
231 housing hole, 232 attaching portion, 233 inclined portion
234 inner peripheral surface, 235 compression trace
24, 240 conductive portion compression member,
241 inner peripheral surface
25 main body-side connection portion
3 jumper socket
31 compression holding portion
32 socket-side connection portion
4 bolt
9 power-transmission line
91 main line
92 core portion, 921 element wire, 922 strand groove
93 conductive portion, 931 element wire
95 jumper wire
M compressor

What is claimed is:
1. An assembly component of a compression type anchor clamp for anchoring a power-transmission line to an anchoring target,
the power-transmission line including
a core portion in which a plurality of element wires are stranded, the element wires each having carbon fiber as the main constituent, and
a conductive portion in which a plurality of aluminum element wires are stranded at an outer periphery of the core portion,
the assembly component of the compression type anchor clamp comprising:
a housing tube that houses an end portion of the core portion;
a core portion compression member, made of steel, that includes a housing hole to house the end portion of the core portion and the housing tube and is to be compressed with the core portion and the housing tube; and
a conductive portion compression member, made of pure aluminum or an aluminum alloy, that houses an end portion of the conductive portion and the core portion compression member and is to be compressed with the conductive portion and the core portion compression member,
wherein the housing tube is constituted by pure aluminum or an aluminum alloy whose Vickers hardness "Hv" is less than or equal to 30, and continuously provided in its cylindrical direction without a gap,
wherein the core portion compression member includes three or more compression traces formed to align in an axial direction of the core portion compression member, said compression traces being formed so as to overlap with the housing hole,
wherein an interval between two adjacent compression traces of the core portion compression member at positions closest to an open side of the core portion compression member is longest among intervals between other two adjacent compression traces,
wherein the core portion compression member includes an inclined portion, provided at an open side of the housing hole, whose outer diameter decreases toward an open end of the housing hole, and
wherein the length of the inclined portion is greater than or equal to ½ times and less than or equal to twice of the outer diameter of the core portion compression member.

2. The assembly component of the compression type anchor clamp according to claim 1, wherein the thickness of the housing tube is greater than or equal to 1.0 mm and less than or equal to 5.0 mm.

3. The assembly component of the compression type anchor clamp according to claim 1, wherein the core portion compression member includes four or more compression traces.

4. A method of constructing a compression type anchor clamp for anchoring a power-transmission line to an anchoring target by using an assembly component of the compression type anchor clamp, the power-transmission line including
a core portion in which a plurality of element wires are stranded, the element wires each having carbon fiber as the main constituent, and
a conductive portion in which a plurality of aluminum element wires are stranded at an outer periphery of the core portion,
the method comprising:
a preparation step of preparing the assembly component of the compression type anchor clamp according to claim 1 as the assembly component of the compression type anchor clamp;
a housing tube housing step of housing the housing tube, in which an end portion of the core portion exposed by stepwisely peeling an end portion of the power-transmission line is housed, in the housing hole of the core portion compression member;
a core portion connecting step of connecting the core portion and the core portion compression member by compressing the core portion compression member to deform the housing tube via the core portion compression member to be fitted into a strand groove of the core portion so that spaces between the core portion and the housing tube are filled; and
a conductive portion connecting step of connecting an end portion of the conductive portion and the core portion compression member with the conductive portion compression member by housing the end portion of the conductive portion and the core portion compression member in the conductive portion compression member, and compressing the conductive portion compression member.

5. The method of constructing the compression type anchor clamp according to claim 4, wherein the thickness of the housing tube is greater than or equal to ½ times and less than or equal to 3/2 times of a diameter of the element wire of the core portion.

6. The method of constructing the compression type anchor clamp according to claim 4, wherein a difference between an inner diameter of the housing tube and a diameter of a circumcircle of the core portion is less than or equal to ⅕ times of the diameter of the circumcircle of the core portion, before compression.

7. The method of constructing the compression type anchor clamp according to any one of claim 4, wherein a compressibility ratio in the core portion connecting step is greater than or equal to 5% and less than or equal to 15%.

8. The method of constructing the compression type anchor clamp according to claim 4, wherein the core portion compression member includes an inclined portion, provided at an open side of the housing hole, whose outer diameter decreases toward an open end of the housing hole.

9. The method of constructing the compression type anchor clamp according to claim 8, wherein in the core portion connecting step, compression of the core portion compression member is separately performed for a plurality of times from an inclined portion side in an axial direction of the core portion compression member.

10. An anchor structure of a power-transmission line comprising:
the power-transmission line including
a core portion in which a plurality of element wires are stranded, the element wires each having carbon fiber as the main constituent, and
a conductive portion in which a plurality of aluminum element wires are stranded at an outer periphery of the core portion; and
a compression type anchor clamp that is anchored to an anchoring target by being compressed with an end portion of the power-transmission line,
wherein the compression type anchor clamp includes
a housing tube including an inner peripheral surface that is formed to fill strand grooves of the core portion and adheres to the core portion along an outer peripheral outline of the core portion,
a core portion compression member made of steel and including an inner peripheral surface that adheres to the housing tube along an outer peripheral outline of the housing tube, and
a conductive portion compression member made of pure aluminum or an aluminum alloy and including an inner peripheral surface that adheres to the core portion compression member along an outer peripheral outline of the core portion compression member, and
wherein the housing tube is constituted by pure aluminum or an aluminum alloy, and continuously provided in its cylindrical direction without a gap,
wherein the core portion compression member includes three or more compression traces formed to align in an axial direction of the core portion compression member, said compression traces being formed so as to overlap with a housing hole that houses the housing tube,
wherein an interval between two adjacent compression traces of the core portion compression member at positions closest to an open side of the core portion compression member is longest among intervals between other two adjacent compression traces,
wherein the core portion compression member includes an inclined portion, provided at an open side of the housing hole, whose outer diameter decreases toward an open end of the housing hole, and
wherein the length of the inclined portion is greater than or equal to ½ times and less than or equal to twice of the outer diameter of the core portion compression member.

* * * * *